(12) United States Patent
Ida et al.

(10) Patent No.: US 7,030,540 B2
(45) Date of Patent: Apr. 18, 2006

(54) ELECTRIC MOTOR AND COMPRESSOR

(75) Inventors: Kazuo Ida, Kusatsu (JP); Ryuichiro Amano, Kusatsu (JP); Hiroaki Kojima, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/488,041

(22) PCT Filed: Apr. 16, 2003

(86) PCT No.: PCT/JP03/04862

§ 371 (c)(1),
(2), (4) Date: Feb. 27, 2004

(87) PCT Pub. No.: WO03/096514

PCT Pub. Date: Nov. 20, 2003

(65) Prior Publication Data

US 2005/0067915 A1 Mar. 31, 2005

(30) Foreign Application Priority Data

May 8, 2002 (JP) .............................. 2002-133110

(51) Int. Cl.
*H02K 1/00* (2006.01)
(52) U.S. Cl. ........................................ 310/316; 310/45
(58) Field of Classification Search ................ 310/216, 310/217, 218, 254, 43, 45
See application file for complete search history.

(56) References Cited

U.S. PATENT DOCUMENTS

| 4,085,347 A | * | 4/1978 | Lichius ........................ 310/259 |
| 6,301,773 B1 | * | 10/2001 | Chemburkar ................. 26/596 |
| 6,407,472 B1 | * | 6/2002 | Takayanagi ................... 310/45 |
| 6,509,665 B1 | * | 1/2003 | Nishiyama et al. ......... 310/215 |
| 6,803,693 B1 | * | 10/2004 | Shah et al. ................... 310/216 |

FOREIGN PATENT DOCUMENTS

| JP | 50-26002 | 3/1975 |
| JP | 56-169513 | 12/1981 |
| JP | 61-134660 | 8/1986 |
| JP | 01-198253 | 9/1989 |
| JP | 1-147647 | 10/1989 |
| JP | 4-299039 | 10/1992 |
| JP | 05-068352 | 3/1993 |
| JP | 6-90543 | 3/1994 |
| JP | 6-253522 | 9/1994 |
| JP | 9-163641 | 6/1997 |
| JP | 10-271732 | 9/1998 |
| JP | 2000-184633 | 6/2000 |

* cited by examiner

*Primary Examiner*—Darrem Schuberg
*Assistant Examiner*—Nguyen Hahn
(74) *Attorney, Agent, or Firm*—Shinjyu Global IP Counselors

(57) ABSTRACT

In an electric motor including a stator core having a plurality of layered steel thin plates, the rigidity of the stator core is maintained and the vibration during its operation is suppressed. Namely, at least parts of the thin plates of the stator core are adhered to each other by a varnish that is an insulating adhesive.

2 Claims, 3 Drawing Sheets

ELECTRIC MOTOR AND COMPRESSOR

TECHNICAL FIELD

The present invention relates to an electric motor including a stator core that is constituted of a plurality of layered steel thin plates and a compressor comprising the electric motor, and particularly to measures against deformation during assembling of the stator core and vibration during driving of the electric motor.

BACKGROUND ART

Conventionally, a direct current motor as an example of an electric motor is well known, and the direct current motor is used, for example, for a compressor. The direct current motor includes a stator core that is constituted of a plurality of layered steel thin plates that have, for example, the thickness of 0.35 mm or so. The stator core of such electric motor is generally constituted in a body of a plurality of thin plates that are layered and calked.

Problems to be Solved

Meanwhile, said conventional structure of the stator core may cause deformation, for example, during installing it into a compressor casing by shrinkage fit, due to lack of its rigidity.

Further, the thin plates of the stator core are connected to each other only by calking. Accordingly, the thin plates become unstable so that they can move a little relatively due to gaps occurred between them. As a result, there occurs a problem that the electric motor and the compressor equipped with the electric motor vibrate when the electric motor operates.

The present invention has been devised in view of these problems, and an object of the present invention is to maintain enough rigidity and suppress vibration during the operation of the electric motor by improving a method for connecting the thin plates of the stator core.

DISCLOSURE OF THE INVENTION

In order to achieve the above-described object, the first aspect of the present invention provides an electric motor including a stator core (10) that is constituted of a plurality of layered steel thin plates (9, 9), wherein the thin plates (9, 9) of the stator core (10) are adhered to each other through at least part thereof by an insulating adhesive (16).

According to the above-described structure, the rigidity of a sheet of the thin plate (9) constituting the stator core (10) is weak, but a plurality of the thin plates (9, 9) are adhered to each other through at least part thereof by the insulating adhesive (16). As a result, the thin plates (9, 9) are connected to each other so as to be in a body as a whole. Thus, no deformation occurs, for example, during installing the stator core (10) into a casing (3) of the compressor (2) or the like by shrinkage fit, due to lack of rigidity of the stator core (10).

Further, the adhesive (16) fills up at least part of a gap (15) between the thin plates (9, 9). As a result, the vibration caused due to the gap (15) during the operation of the electric motor can be suppressed. Accordingly, the electric motor that includes the stator core (10) with enough rigidity and suppresses the vibration during its operation can be obtained.

The second aspect of the present invention provides the electric motor, wherein the thin plates (9, 9) are adhered to each other through only core outer-peripheral edge potions (10a, 10a) thereof by the adhesive (16).

According to this structure, the thin plates (9, 9) are just adhered to each other through only the core outer-peripheral edge potions (10a, 10a) thereof by the adhesive (16). As a result, the adhesive (16) can be provided easily by painting or the like, and it may be possible that the amount of the adhesive (16) to be used reduces. Accordingly, such stator core (10) can provide the electric motor performing the effect of the first aspect of the invention effectively.

The third aspect of the present invention provides the electric motor, wherein the thin plates (9, 9) are adhered to each other by the adhesive (16) that permeates into an inner portion of the core from a core outer-peripheral face and/or a core inner-peripheral face.

According to this structure, the adhesive (16) fills up the gap (15) between the thin plates (9, 9) of the stator core (10) more certainly. Further, for example, dipping the entire of the stator core (10) in the adhesive (16) can make the adhesive (16) permeate into the inner portion of the core from the core outer-peripheral face and/or the core inner-peripheral face easily. Accordingly, this can provide the electric motor performing the effect of the first aspect of the invention more effectively.

The fourth aspect of the present invention provides the electric motor, wherein the adhesive (16) is made from an epoxy-based varnish.

According to this structure, the epoxy-based varnish is generally used for impregnation often, and so it is easy to obtain.

The fifth aspect of the present invention provides the electric motor, wherein a coil is wound to each tooth portion (12) of the stator core (10).

According to this structure, it constitutes a concentrated-coiling type in which the coil is wound to each tooth portion (12) of the stator core (10). Although vibration of the stator core (10) of this concentrated-coiling type tends to cause a noise from the electric motor easily, even such vibration can be suppressed effectively.

The sixth aspect of the present invention provides a compressor comprising the above-described electric motor (1).

According to this structure, the most appropriate compressor that performs the effect of the present invention effectively can be obtained.

Effects of the Invention

As described above, according to the first aspect of the present invention, the thin plates of the stator core are adhered to each other through at least part thereof by the insulating adhesive. As a result, increasing its rigidity without a failure to perform the function of the stator core can reduce vibration caused by the electric motor during its operation.

According to the second aspect of the present invention, the thin plates are adhered to each other through only core outer-peripheral edge potions thereof by the adhesive. As a result, the adhesive can be provided easily at the stator core, and it may be possible that the amount of the adhesive to be used reduces.

According to the third aspect of the present invention, the thin plates are adhered to each other by the adhesive that permeates into the inner portion of the core from the core outer-peripheral face and/or the core inner-peripheral face. As a result, this can provide the electric motor performing the effect of the first aspect of the invention more effectively.

According to the fourth aspect of the present invention, the adhesive is made from an epoxy-based varnish. As a result, it can provide an easy obtaining of the adhesive, and the above-described functions and effects can be obtained easily as well.

According to the fifth aspect of the present invention, the coil is wound to each tooth portion of the stator core with the concentrated coiling. As a result, this can provide the electric motor performing the effects of the first aspect of the invention effectively.

According to the sixth aspect of the present invention, it provides the compressor comprising the above-described electric motor. As a result, the most appropriate compressor that performs the effects of the present invention effectively can be obtained.

BEST MODE FOR CARRING OUT THE INVENTION

An embodiment of the present invention will be described with reference to the accompanying drawings.

Figure 4:
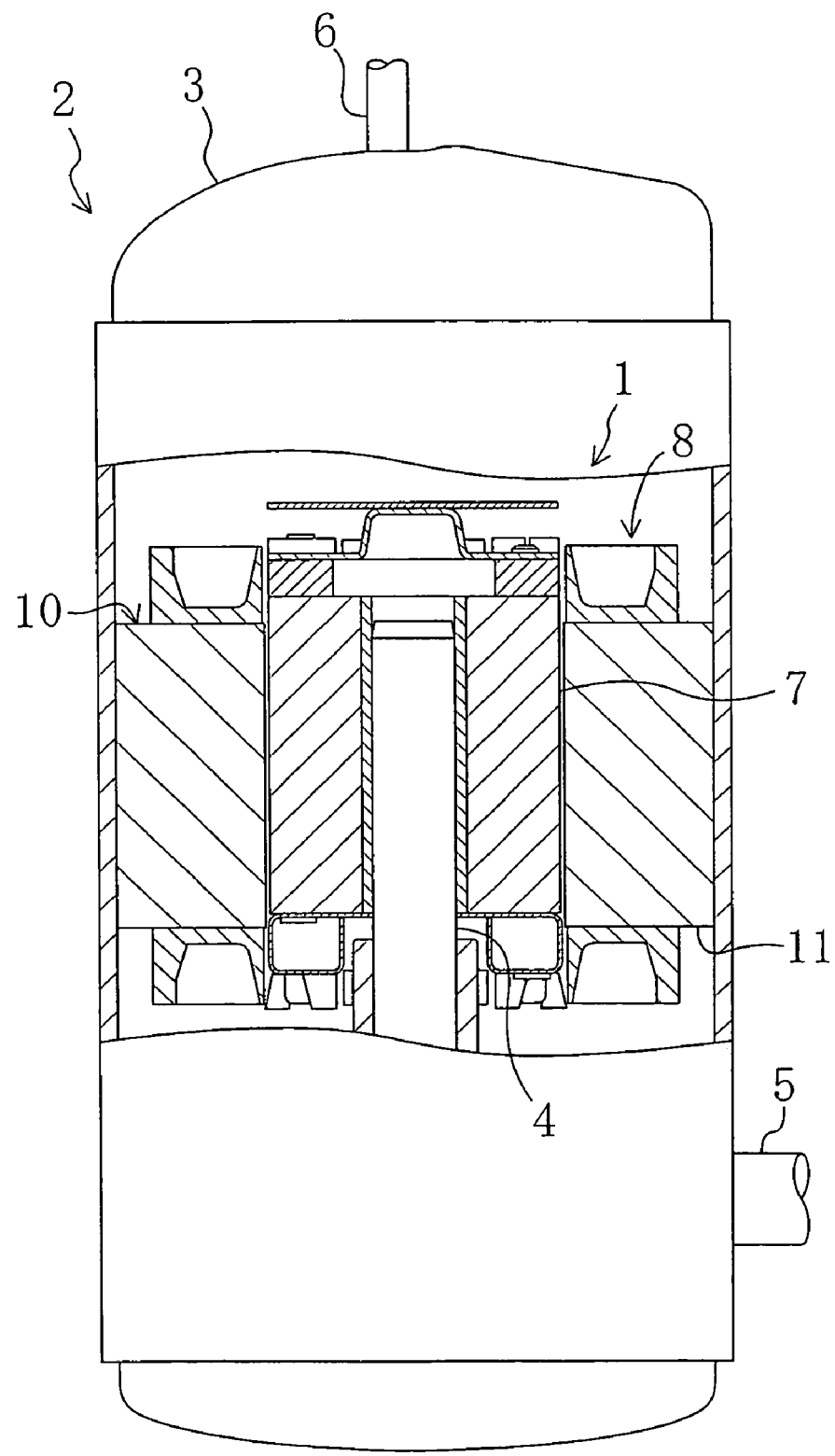
FIG. 4 is a plan view partly in section of a compressor according to an embodiment of the present invention.

FIG. 4 shows a compressor (2) according to the present embodiment. The compressor (2) is used for an air conditioner and the like.

The compressor (2) includes a sealed type of substantially cylindrical casing (3) having a suction pipe (5) and a discharge pipe (6), which are attached to the casing (3) such that they penetrate therein. The casing (3) is provided with a compressing mechanism for compressing a gas (not shown in any drawings) and an electric motor (1) coupled to the compressing mechanism through a drive shaft (4). The electric motor (1) drives the compressing mechanism. This driving makes the compressing mechanism suck the gas through the suction pipe (5) and compress it to discharge into a sealed space (discharge space) in the casing (3). The high-pressure gas in the space is discharged out of the casing (3) through the discharge pipe (6).

The electric motor (1) includes a rotor (7) coupled to the drive shaft (4) and a stator (8) disposed around the rotor (7). The rotor (7) has permanent magnets (not shown in any drawings) that are buried therein.

Figure 2:
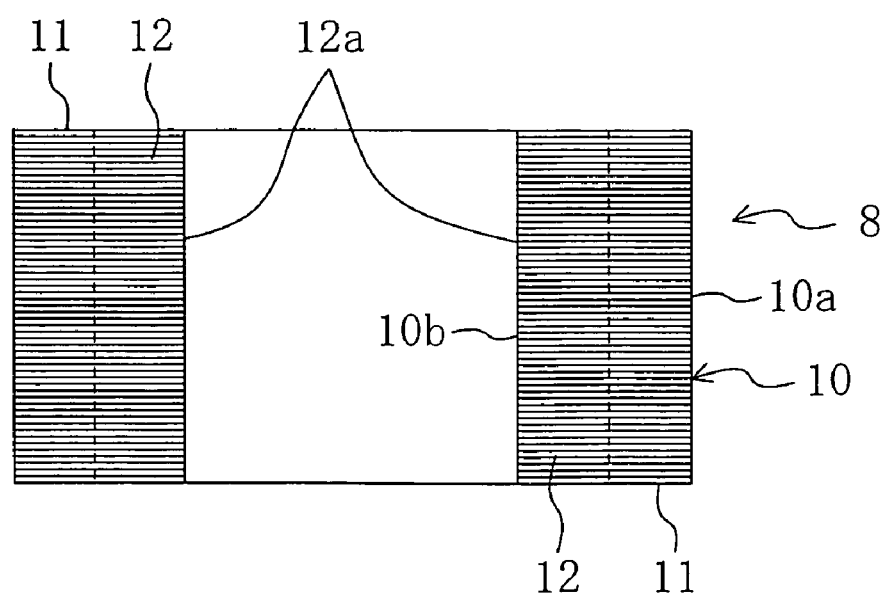
FIG. 2 is an elevation view in section of the stator core.
Figure 3:
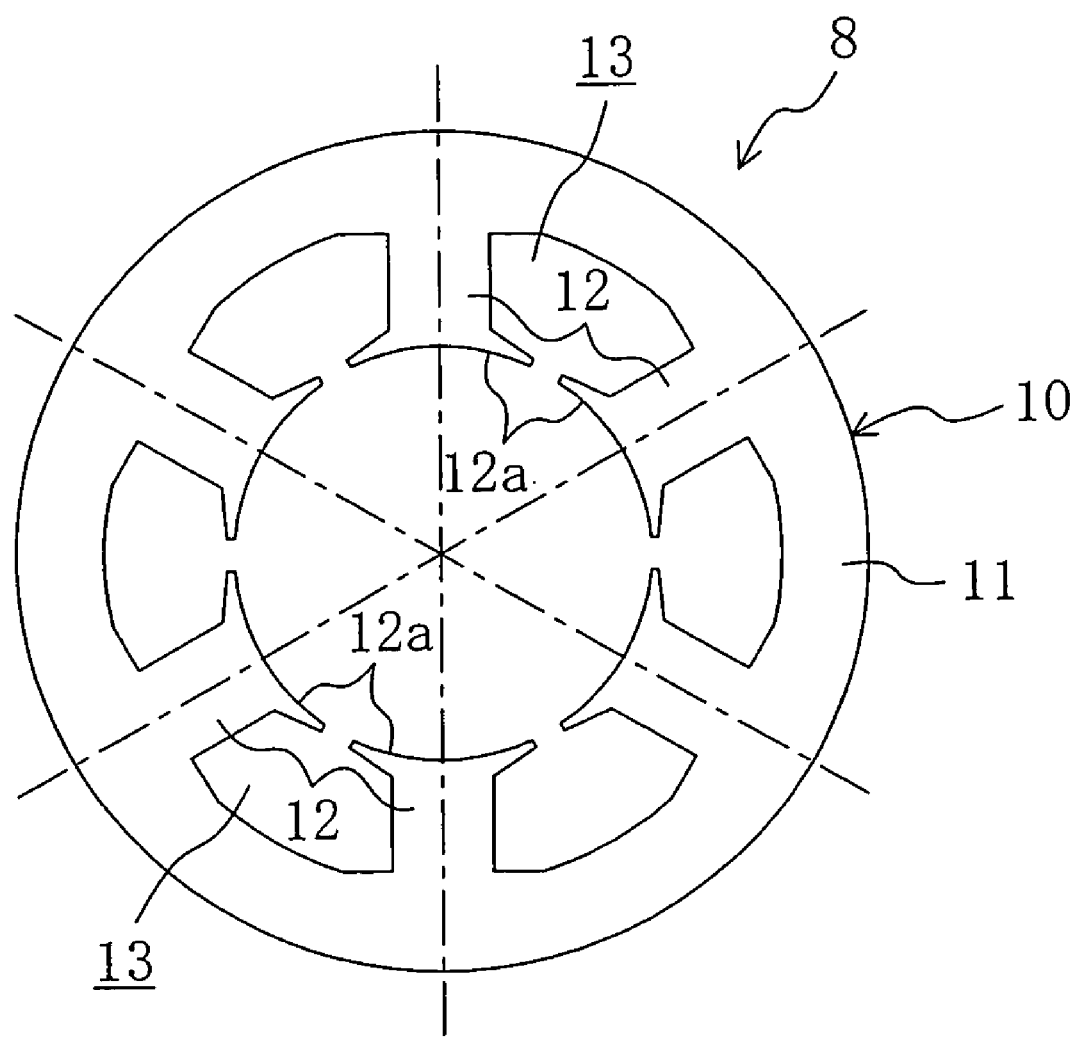
FIG. 3 is a plan view of the stator core.

As shown in FIGS. 2 and 3, the stator (8) includes a stator core (10). The stator core (10) is constituted in a body of a plurality of steel thin plates with the same shape (9, 9, . . . ) that are layered and calked. Namely, the stator core (10) includes, for example, a ring-shape core body (11) and six tooth portions (12, 12, . . . ) that are disposed at the inner-peripheral face of the core body (11) at equal spaces in the peripheral direction, projecting inwardly in the radial direction.

Each tooth portion (12) is provided with a flange (12a) at an end portion thereof (inner-end portion), which extends in the circumferential direction and has an arc face at its end. A slot (13) is formed between the adjacent tooth portions (12, 12), which opens toward the center of the stator core (10) between the flanges (12a, 12a) of the two tooth portions (12, 12).

Further, a wire is wound directly to each tooth portion (12) of the stator core (10) such that it is placed inside of the slot (13), resulting in forming a coil (not shown in any drawings). This structure constitutes a concentrated-coiling type of stator (8).

Figure 1:
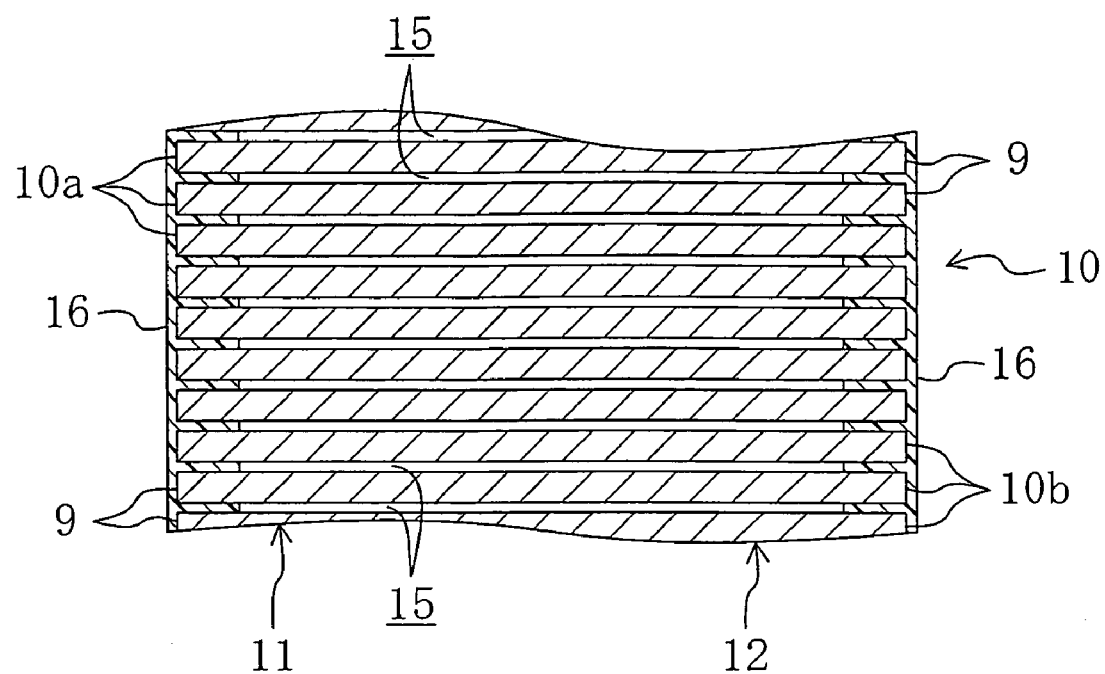
FIG. 1 is an enlarged sectional view showing a state where thin plates of a stator core are adhered to each other by a varnish filled up between the thin plates.

As shown in FIG. 1, a small gap (15) is formed between the layered thin plates (9, 9) of the stator core (10). Here, the gap (15) is shown exaggeratingly in this figure so that the future of the present invention can be understood easily.

Herein, as the future of the present invention, the thin plates (9, 9) are adhered to each other through part of the gap (15) between the both, namely through an outer-peripheral edge potion (10a) and an inner-peripheral edge potion (10b) of the stator core (10) by a vanish (16) that is an epoxy-based insulating adhesive.

A method for adhering the thin plates (9, 9) to each other by the varnish (16) disposed at the stator core (10), for example, is the following.

First, the stator core (10) that is formed in a state where a plurality of the thin plates (9, 9, . . . ) are just layered and calked is dipped into the varnish (16) in a container (not shown in any drawings), so that the varnish (16) permeates into the gaps (15, 15, . . . ) by an osmotic pressure. Then, after a certain time pasts, the stator core (10) with the varnish (16) is took out of the container and heated by a heater (not shown in any drawings) so as to become hard.

Now, a wire is wound to each tooth portion (12) of the stator core (10) with the varnish (16) to form a coil. The stator core (10) with the coil is installed in the casing (3) of the compressor (2), along with the rotor (7) that remains un-magnetized and the compressing mechanism. In this installed state, an electric current for magnetization is supplied, thereby magnetizing magnets of the rotor.

Accordingly, in the above-described embodiment, the electric motor (1) drives the compressing mechanism during the operation of the compressor (2). This driving makes the compressing mechanism suck the gas through the suction pipe (5) and compress it to discharge into the casing (3). Then, the high-pressure gas is discharged out of the casing (3) through the discharge pipe (6).

Herein, in the stator core (10) of the electric motor (1), the thin plates (9, 9) are adhered to each other through part of the gap (15) between the both, namely through an outer-peripheral edge potion (10a) and an inner-peripheral edge potion (10b) of the stator core (10) by the varnish (16). As a result, any vibration from the electric motor (1) and the compressor (2) would not occur due to the gap (15) formed between the thin plates (9, 9).

Further, because the adhesive (16) is made from an insulating material, the thin plates (9, 9) are isolated from each other electrically and thus the basic function of the stator core (10) can be maintained. Namely, the electric motor (1) that has the stator core (10) with a high rigidity and suppresses the vibration during its operation can be obtained. Accordingly, although the rigidity of a sheet of the thin plate (9) constituting the stator core (10) is weak, the thin plates (9, 9) are adhered to each other through part thereof by the varnish (16). Thus, no deformation occurs during installing the stator core (10) into the casing (3) of the compressor (2) by shrinkage fit, due to lack of its rigidity.

Herein, in the above-described embodiment, the thin plates (9, 9) of the stator core (10) are adhered to each other through part of the gap (15) between the both, namely through the outer-peripheral edge potion (10a) and the inner-peripheral edge potion (10b) of the stator core (10) by the vanish (16). Instead of this, the thin plates (9, 9) of the stator core (10) may be adhered to each other through only the outer-peripheral edge potion (10a) of the stator core (10) by the varnish (16). In this case, because the varnish (16) is provided at only the outer-peripheral edge potion of the stator core (10), it is easy to provide the varnish (16), thereby being possible to reduce the amount of the varnish to be used.

Further, in the above-described embodiment, the electric motor (1) is provided at the compressor, but it may not be provided at the compressor. In short, any electric motor including a stator core constituted of a plurality of layered steel thin plates may be applicable to the present invention.

INDUSTRIAL APPLICABILITY

As described above, the electric motor and the compressor comprising the electric motor according to the present invention are useful for an air conditioner and the like, and particularly for ones including a stator core constituted of a plurality of layered steel thin plates.

The invention claimed is:

1. A compressor comprising:
   a casing;
   a compressing mechanism disposed in said casing and configured to discharge gas into said casing; and
   an electric motor disposed in said casing including
      a stator core having a plurality of layered steel thin plates,
      a plurality of tooth portions disposed on said stator core, and
      a coil wound on each of said tooth portions of said stator core, said coil being wound with concentrated winding,
   said thin plates being adhered to each other at an outer-peripheral edge portion of said stator core and an inner-peripheral edge portion of said stator core by an insulating adhesive, and said thin plates being calked,
   said thin plates forming a plurality of gaps between said thin plates, said gaps having inner and outer portions adjacent said inner-peripheral edge portion and said outer-peripheral edge portion, respectively, and
   said inner and outer portions of said gaps having said insulating adhesive therein.

2. The compressor of claim 1, wherein said adhesive is made from an epoxy-based varnish.

* * * * *